United States Patent Office 3,413,356
Patented Nov. 26, 1968

3,413,356
PROCESS FOR THE PREPARATION OF
ORTHOARYLPHENOLS
Leo Vollbracht, Arnhem, Albert H. Bijkerk, Rheden, and Jan Iedema, Ede, Netherlands, assignors to N.V. Polychemie Aku-Ge, Arnhem, Netherlands, a corporation of the Netherlands
No Drawing. Filed May 10, 1966, Ser. No. 548,831
Claims priority, application Netherlands, May 20, 1965, 6506397
4 Claims. (Cl. 260—620)

The invention relates to a process for the preparation of orthoarylphenols i.e., phenols which have an aryl group in at least one of the ortho positions. An important phenol of this group of orthoarylphenols is 2,6-diphenylphenol, which is an important starting material in the chemical industry.

A process for the preparation of 2,6-diphenylphenol is known (cf. J. Plesek, Collection Czechoslov, Chem. Commun. vol. 21 (1956) pp. 375–381). By the known process this compound is prepared by alkaline condensation of cyclohexanone to a mixture of tricyclic monoketones, which mixture is dehydrogenated to 2,6-diphenylphenol.

The known process is rather complicated and can be used only for the preparation of this particular compound.

The object of the present invention is to provide a process by which orthoarylphenols may be prepared starting from phenols which have at least one free ortho position.

The process according to the present invention comprises heating a phenol having at least one free ortho position in the presence of a tetra-aryllead compound. The process may be carried out by melting the two reactants together. The reaction may also be carried out in a reaction medium in which one of the reactants or both dissolve and which is inert to the reactants.

The highest yields of orthoarylphenol are obtained when the reaction is carried out at a temperature ranging between 150 and 250° C., and this constitutes a preferred temperature range for purposes of the present invention.

As mentioned above, the starting material in the process should be a phenol having at least one free ortho position. Examples of such phenols are, inter alia; phenol, cresols, xylenols, except 2,6-xylenol, and other mono- or polysubstituted phenol derivatives having at least one free ortho position.

The starting material may also be formed by more complex compounds, such as oestrane derivatives having a hydroxyl group in the one, two, three or four-position.

The tetra arylcompounds used in the process according to the invention are compounds in which an aromatic group is linked to lead through a carbon atom of its benzene ring. Examples of suitable compounds are, inter alia, tetraphenyllead, tetratolyllead, tetraxylyllead, etc.

The invention is of special importance for the preparation of 2,6-diphenylphenol, which is prepared by heating phenol in the presence of tetraphenyllead.

A different and also important compound which may be prepared according to the invention is 2-phenyl-6-methylphenol, which is obtained by heating orthocresol in the presence of tetraphenyllead.

The invention will be further illustrated by reference to the following examples.

Example I

Fifteen millimols of tetraphenyllead and 10 millimols phenol are melted together in a porcelain crucible and maintained molten for 100 minutes. The products formed in the reaction are mainly orthophenylphenol and 2,6-diphenylphenol.

Example II

Twenty millimols tetraphenyllead are heated in the presence of 20 millimols orthophenylphenol for 75 minutes at 210° C. The product formed in the reaction is mainly 2,6-diphenylphenol and 2,4-diphenylphenol may be isolated as a by-product.

Example III

Ten millimols tetraphenyllead are heated in the presence of 40 millimols orthophenylphenol for 30 minutes at 210° C. The products formed in the reaction are 2,4-diphenol, 2,6-diphenylphenol and 2,4,6-triphenylphenol.

What we claim as new and desire to secure by Letters Patent of the United States is:

1. A process for the preparation of orthophenylphenols comprising the step of heating a member selected from the group consisting of phenol and methyl substituted phenols having at least one free ortho position in the presence of tetraphenyllead at a temperature ranging between 150 and 250° C. for a time sufficient to form the orthophenylphenol up to a maximum of 100 minutes.

2. A process according to claim 1 wherein 2,6-diphenylphenol is prepared by heating unsubstituted phenol in the presence of tetraphenyllead.

3. The process of claim 2 where the reaction is performed by melting together the phenol and tetraphenyllead.

4. A process according to claim 1 wherein 2-phenyl-6-methylphenol is prepared by heating orthocresol in the presence of tetraphenyllead.

References Cited

Koton et al.: Zhur. Obshchet Khim (J. Gen. Chem.) 19, 1675–8 (1949). CA. 44, 1436f.

BERNARD HELFIN, *Primary Examiner.*

H. ROBERTS, *Assistant Examiner.*